Figure 16:
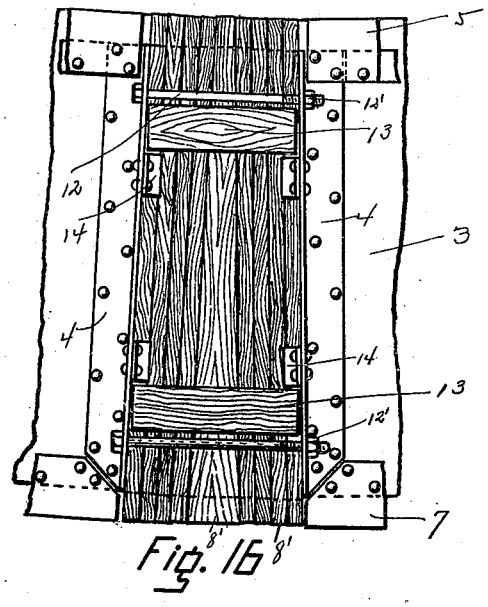

R. B. TUFTS.
CONCRETE MOLD.
APPLICATION FILED JULY 21, 1908.
977,763.
Patented Dec. 6, 1910.
6 SHEETS—SHEET 1.
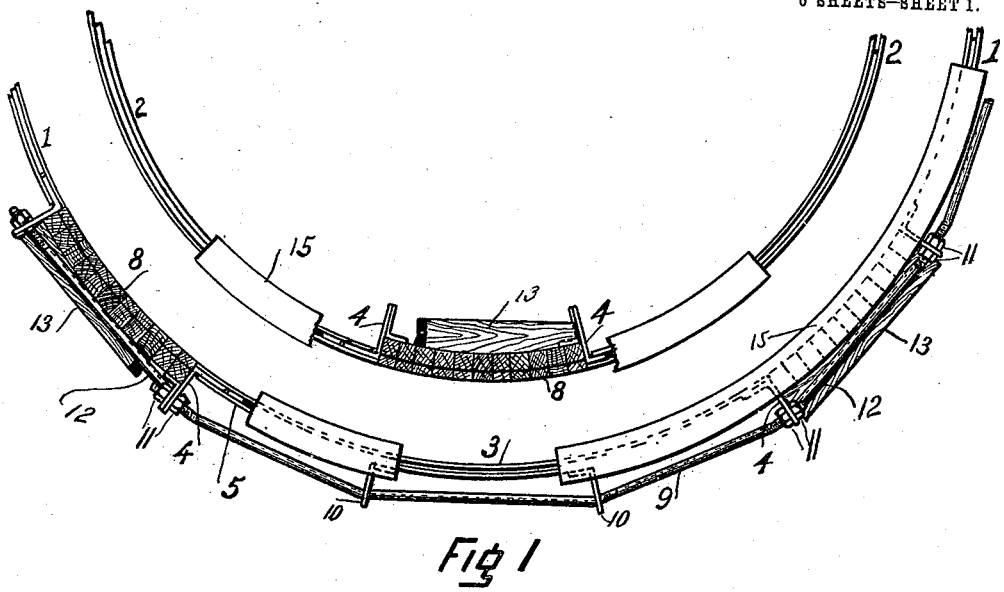
Fig 1
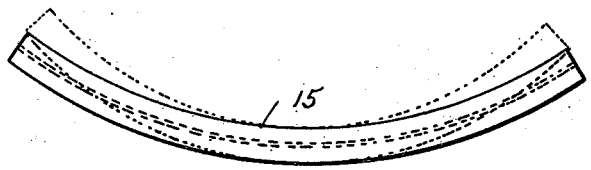
Fig 2
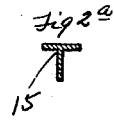
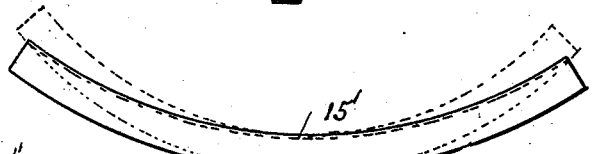
Fig 3
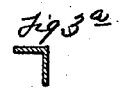
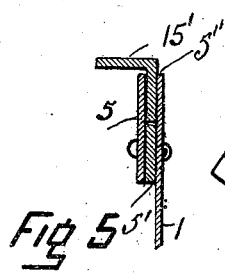
Fig 5
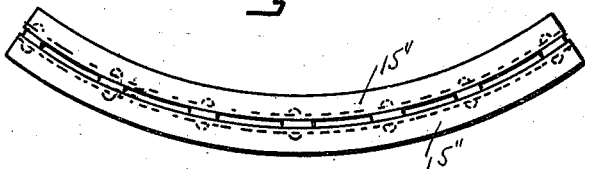
Fig 4
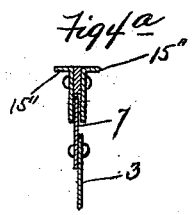
WITNESSES:
INVENTOR.
Robert B Tufts
BY
G. Howlett Davis
ATTORNEY.

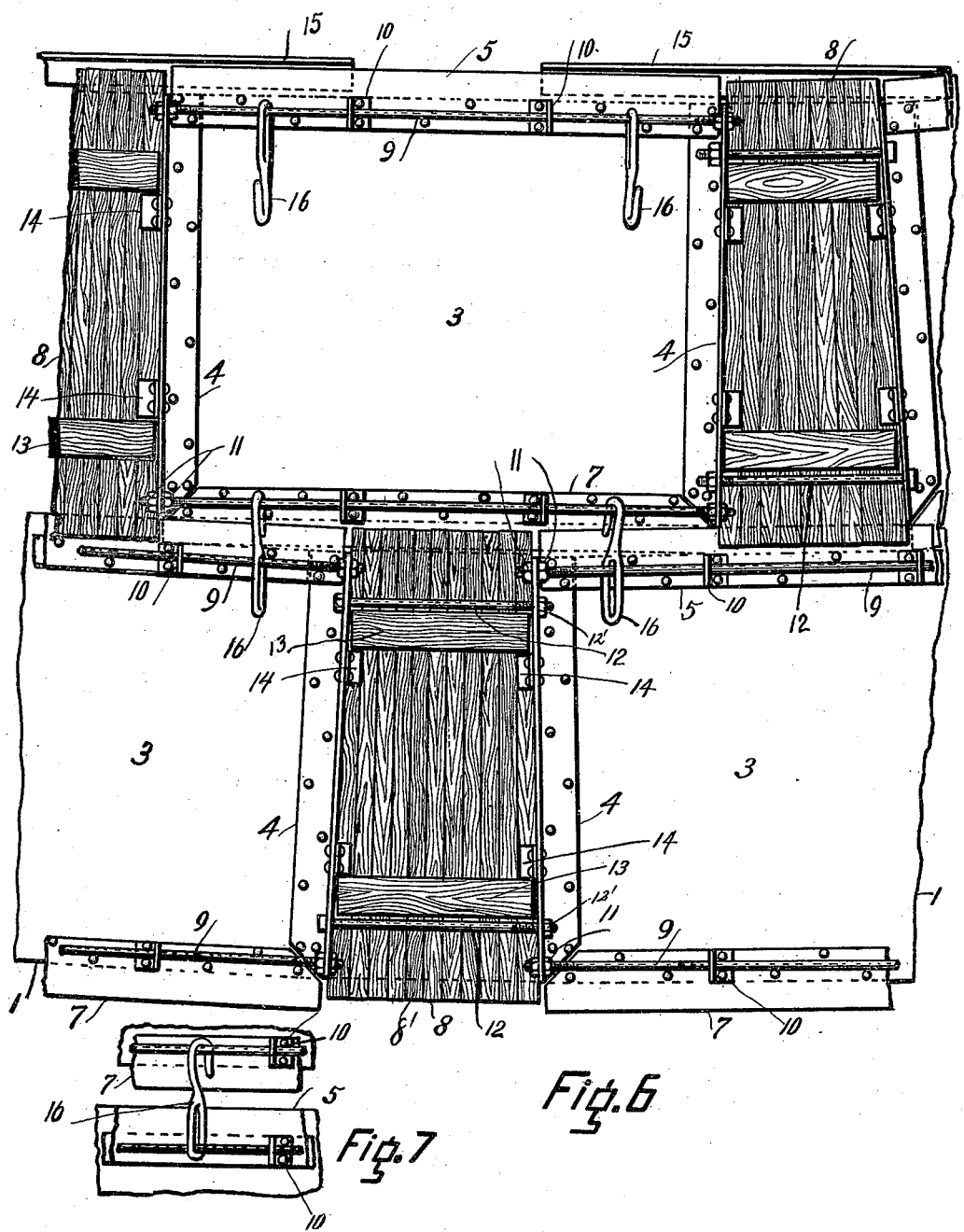

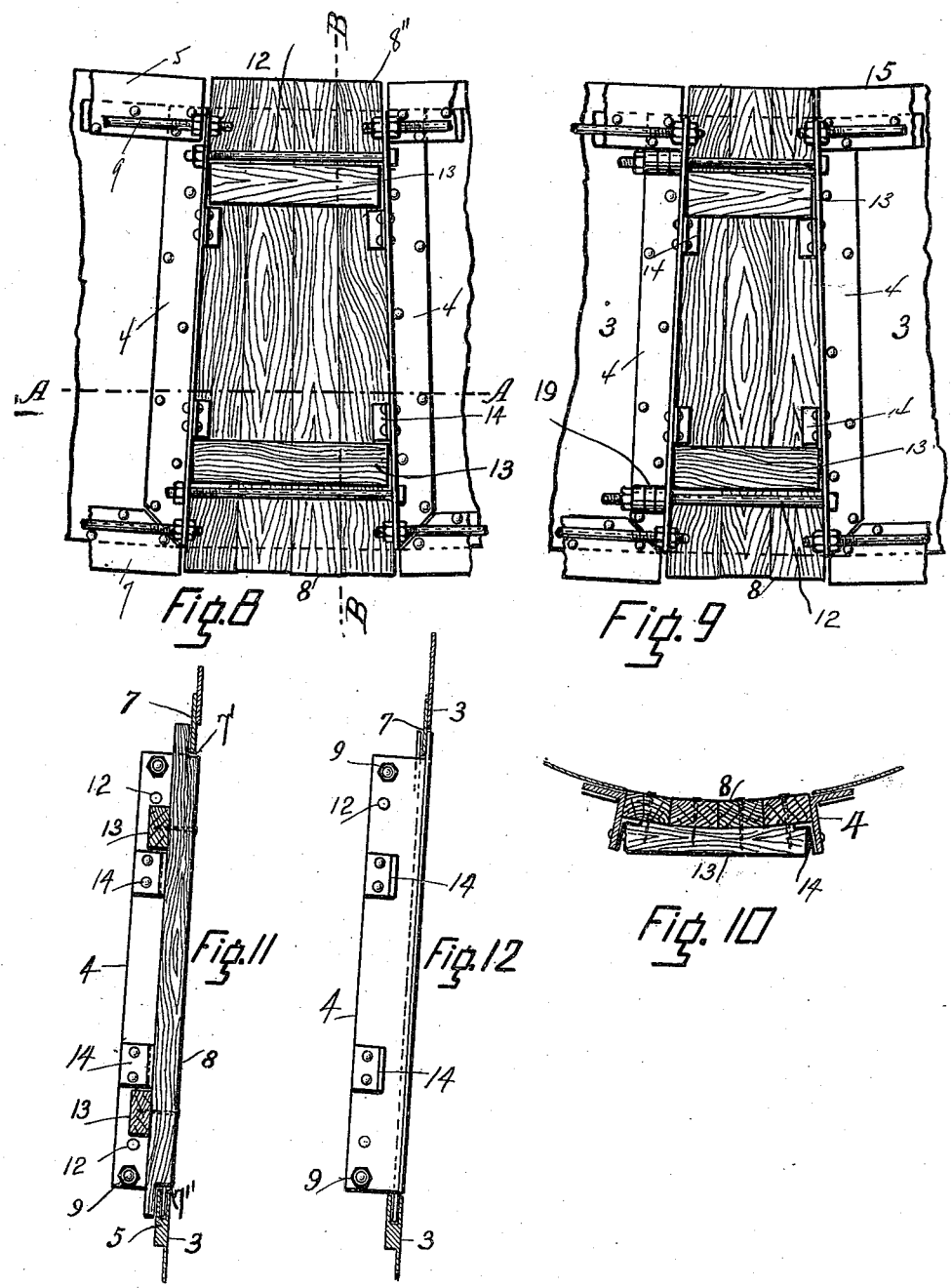

R. B. TUFTS.
CONCRETE MOLD.
APPLICATION FILED JULY 21, 1908.
977,763.
Patented Dec. 6, 1910.
6 SHEETS—SHEET 4.
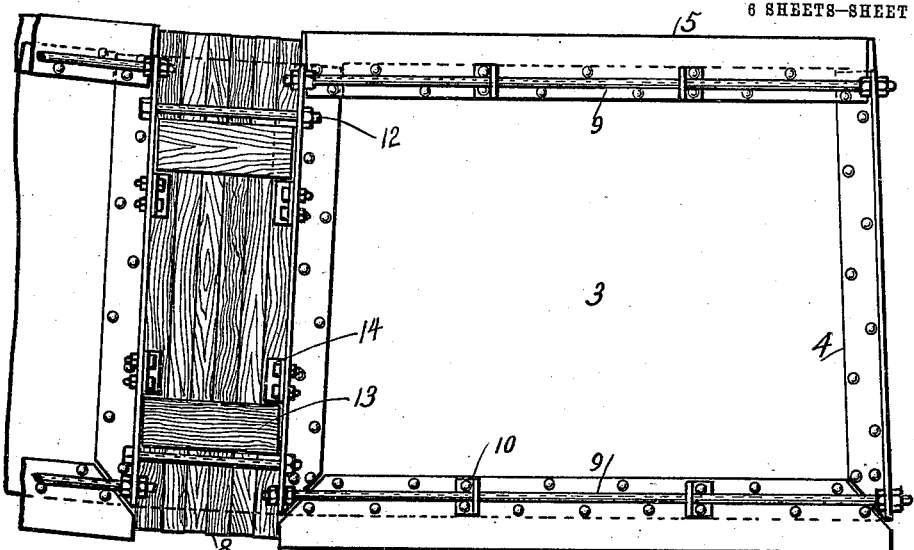
Fig. 13
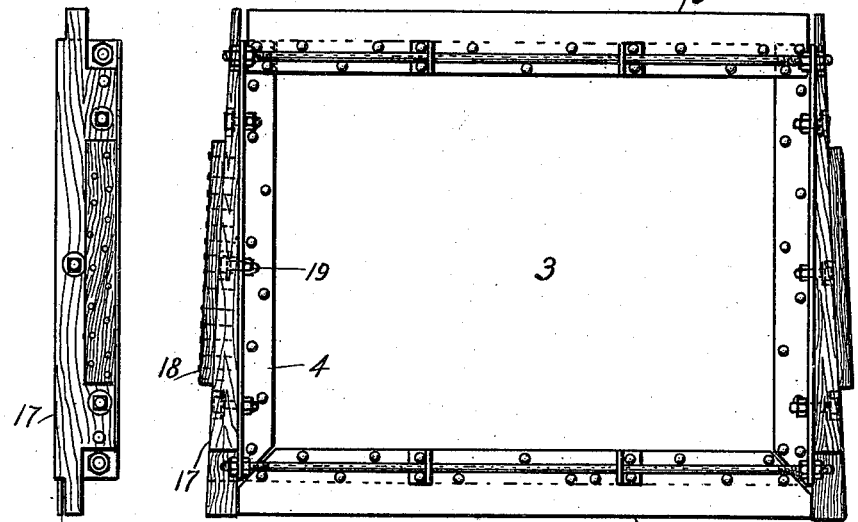
Fig. 15
Fig. 14
WITNESSES:
E. W. Oxford
H. H. Byrne
INVENTOR.
Robert B. Tufts
BY G. Howlett Davis
ATTORNEY.

R. B. TUFTS.
CONCRETE MOLD.
APPLICATION FILED JULY 21, 1908.

977,763.

Patented Dec. 6, 1910.
6 SHEETS—SHEET 5.

WITNESSES:
E. W. Oolford
H. H. Byrne

INVENTOR.
Robert B. Tufts
BY G. Howlett Davis
ATTORNEY.

R. B. TUFTS.
CONCRETE MOLD.
APPLICATION FILED JULY 21, 1908.
977,763.
Patented Dec. 6, 1910.
6 SHEETS—SHEET 6.
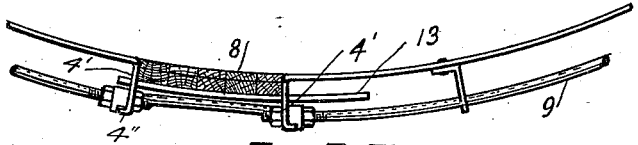
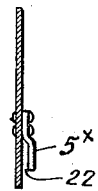
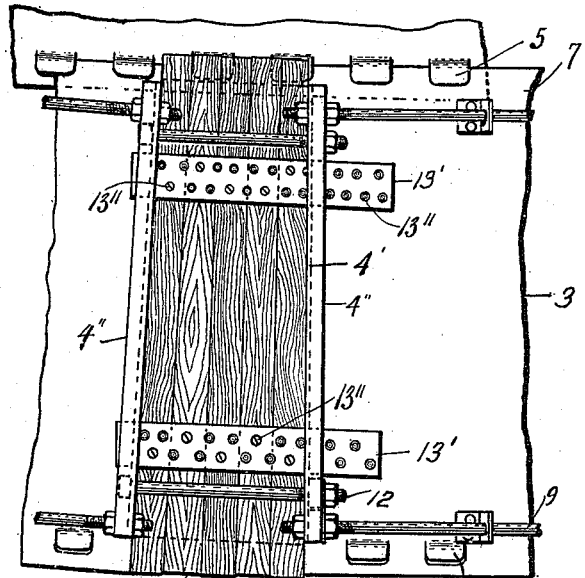
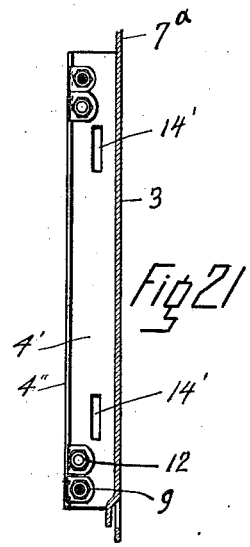
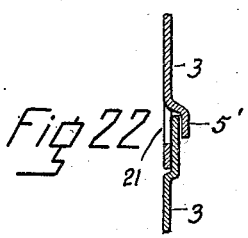
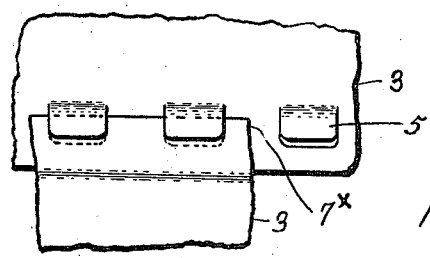
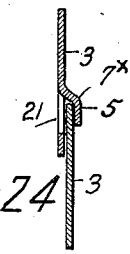
WITNESSES:
E. W. Colford
H. H. Byrne
INVENTOR.
Robert B. Tufts
BY G. Howlett Davis
ATTORNEY.

UNITED STATES PATENT OFFICE.

ROBERT B. TUFTS, OF ATLANTA, GEORGIA.

CONCRETE-MOLD.

977,763.  Specification of Letters Patent.  Patented Dec. 6, 1910.

Application filed July 21, 1908.  Serial No. 444,685.

*To all whom it may concern:*

Be it known that I, ROBERT B. TUFTS, a citizen of the United States, residing at Atlanta, in the county of Fulton and State of Georgia, have invented certain new and useful Improvements in Concrete-Molds, of which the following is a specification.

My invention relates to improvements in molds, and more particularly to sectional molds such as are employed in forming concrete or like material into conical or cylindrical structures, such as light houses, chimneys, water towers, etc.

The purpose of the invention is to provide a sectional mold by means of which can be formed hollow structures such as those just enumerated, and which by making slight alterations or changes in assembling the parts the mold may be adapted to molding such structures as these of various designs.

A further object of my invention is to make it practical to mold hollow circular structures in successive horizontal courses, the molds being made up of members capable of being removed piece by piece from a position where no longer needed, and readjusted and arranged to mold a new similar section superposed on the latter.

The structure of the several sections comprising the mold is such that the diameters of the mold rings may be adjusted independently at the top and bottom, so that each course may be made to conform in shape to a frustum of a cone of any desired diameter at the top and bottom, and consequently any desired degree of slant, thus making it possible to build towers and the like larger at the base and slanting as the construction proceeds.

With these and subordinate objects in view, my invention consists in certain novel features of construction and combinations and arrangements of parts as hereinafter set forth and defined by the claims.

Figure 18:
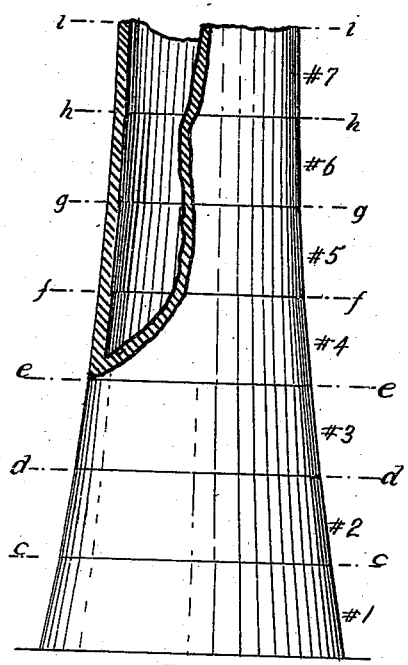
Figure 17:
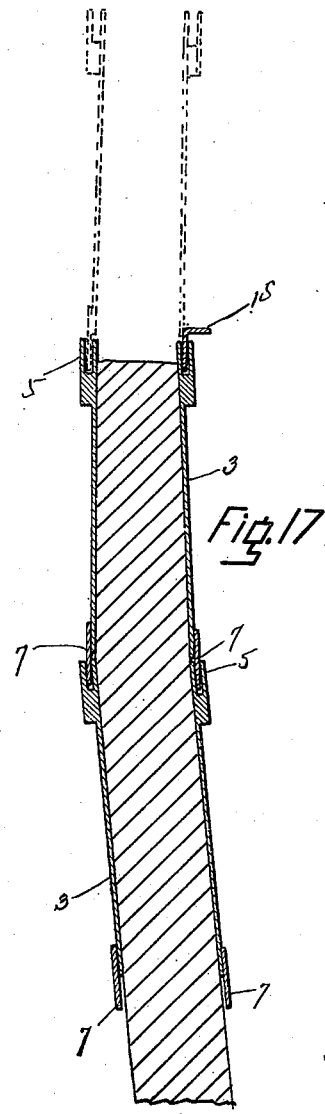

In the accompanying drawings wherein is illustrated the preferred structure of the invention, Figure 1 is a plan view partly in section of part of the molding frames. Fig. 2 is a view of one form of a sectional alining bar. Fig. 2ª is a section of Fig. 2. Fig. 3 is a similar view showing a slight modification. Fig. 3ª is a section of Fig. 3. Fig. 4 is a further modification. Fig. 4ª is a section of Fig. 4. Fig. 5 is a cross section of Fig. 3 in applied position. Fig. 6 is a side elevation of a part of the mold structure. Fig. 7 is a detail showing the application of one of the hangers. Fig. 8 is an elevation of one of the filling-in sections. Fig. 9 is a view of Fig. 8 with a segment removed therefrom. Fig. 10 is a sectional view of Fig. 8 on the line A, A. Fig. 11 is a sectional view of Fig. 8 on the line B, B. Fig. 12 is an end elevation of one of the metallic sections. Fig. 13 is an elevation of a complete metallic and filling-in section. Fig. 14 is a slight modification of one of the metallic sections. Fig. 15 is an end view of Fig. 14. Fig. 16 shows a modification of the wooden section. Fig. 17 is a vertical cross section of a portion of a wall showing the application of two courses of the mold. Fig. 18 shows one of the types of structures to the construction of which my improved mold is particularly adapted. Fig. 19 is a part of a front elevation of a modified form of the metallic and wooden sections. Fig. 20 is a top plan view partly in section of Fig. 19. Fig. 21 is a vertical section of Fig. 19 taken through the metal member 3. Fig. 22 is a detailed section showing a modification in the ring supporting means. Fig. 23 is a front elevation of Fig. 22. Fig. 24 is a detailed section of the ring support shown in Fig. 19. Fig. 25 is a sectional view of a further modification of the ring supporting means.

Referring more in detail to the several views wherein like numerals of reference designate corresponding parts in the different figures shown, this invention comprises an inner and outer shell 1 and 2 providing between them an annular space in which the wall of the structure is molded. Each shell is made up of a number of superposed rings; which rings comprise a plurality of metallic and wooden segments arranged alternately.

The metallic segments designated by the numeral 3 are either rectangular as shown in Figs. 6 and 14, or trapezoidal, as shown in Fig. 13. In both instances the members 3 are rolled or curved so as to approximate in shape a sector of a cylinder. The upper edges have secured thereto and spaced a short distance therefrom a metallic strip 5 (Fig. 5) so as to form a groove, and to the lower edge is secured a strip 7, which depends slightly below the lower edge, and forms a tongue, so that when the several sections of the rings are assembled, and the rings superposed, the tongues 7 at the lower edge of one ring will enter within the groove in the upper edge of a lower ring and cause the rings to aline with each other to insure symmetry of the structure These tongues and grooves may, of course, be arranged in reverse order. Instead of applying the metallic segments 3 with the separate strips 5 and 7 to provide the tongue and grooves, said plates 3 may have struck therefrom along their lower edges, as at 21, a plurality of tongues 5' (see Figs. 19, 22, 23 and 24), which tongues are bent outwardly as at 7×, whereby they provide with the face of the plate a channel. In this instance, the edge of the plate itself serves in place of the flange 7. And as an additional manner of providing a groove for the several plates, said plates may have a plurality of webs 5× riveted thereto along their lower edges, in the manner shown in Fig. 25. The vertical side edges of each sheet 3 have angle-bars 4 secured thereto by rivets or otherwise. These angle-bars serve to facilitate the connection of the several metallic segments of the ring, and also give rigidity to the metallic segments. In the form of mold shown in Figs. 19, 20 and 21, the flanges 4' form an integral part of the metallic plate 3. In this instance the side edges of said plates are bent outwardly to provide said flanges 4' and the edges of said flanges are turned inwardly as at 4''.

The character 7ᵃ indicates the members that engage with the alining means of the superposed plate or ring.

Near the upper and lower edges of the metallic segments, or at a point substantially overlying the tongue and groove members is a truss bar 9 supported thereon by a pair of angle pieces 10, and at their ends said truss-bars are adapted to pass freely through openings in the off-standing flanges of the angle-bars 4. At their ends the truss bars 9 are screw-threaded for a short distance whereby to receive a pair of adjusting nuts 11. In addition to giving strength to the metallic segments these bars 9, through the medium of the nuts 11, serve as a means whereby the plate 3 may be flexed to vary the contour of its molding surfaces. A further function of the truss-bars 9 is that they form a support on which men may stand or lash themselves when necessary to go on the outside of the form for disassembling the parts of the mold or otherwise.

In addition to having trapezoidal metallic segments a means is devised whereby a rectangular metallic segment may be converted into the former. To accomplish this the ends of a rectangular metallic segment has secured to its flanges 4 a wooden tapering piece 17, (Fig. 14) which when locked against the wooden segments 8, gives substantially that effect shown in Fig. 13 wherein the plate 3 is trapezoidal. When this converted form is used (Fig. 14) a pair of cleats 18 nailed to the pieces 17 serve the purpose of the angle-iron members 14 for positioning the wooden segments 8.

The wooden segments or panels 8 comprise a plurality of staves 8' that are screwed, nailed or otherwise fastened to upper and lower cross-battens 13. These battens 13 are preferably of wood and are fixed to the outer side of the staves so as to leave a smooth molding surface on the opposite face of the wooden segments. The object of having the wooden segments thus constructed is to enable a stave or a number of staves to be removed in order to reduce the diameter of a ring, should such be desired. In Fig. 8 an illustration of this is shown. In this view the stave 8'' is to be removed along the line B—B, which will reduce the wooden segments to the proportions shown in Fig. 9. This reduction in the ring is taken up by a number of washers 19 upon the tie bolts 12. In the modified form of mold shown in Figs. 19, 20, and 21, the cross battens 13 are displaced by a pair of plates 13' provided with a plurality of apertures 13'' adapted to receive screws or nails whereby said plates may hold the several wooden segments assembled. In this instance the plates pass through openings 14' in the angle members in which position the several members 8 are held in proper alinement, whereby the inner or active face of the wooden section may present an even and symmetrical surface for the concrete mixture.

In applied position the wooden segments are arranged each between a pair of metallic segments 3 in which position they are held in proper alinement by a number of cleats 14 that are bolted to the flanges of the angle-bars 4.

In general the wooden segments 8 will be placed in each course of molds immediately over the sheet metal segments in the course below, which will place the sheet metal members in each course over the wooden segments in the course below.

The upper and lower inner edges of the wooden segments are rabbeted as indicated by 7' and 7'' respectively. The former providing a space for the flange 7 of the superposed plate and the lower rabbeted edge seats the members providing the groove.

When the several segments of a ring are assembled each pair of metallic segments 3 are connected by an upper and a lower tie-bolt 12 which passes through the flanges of the end angle-bars 4 and extend across the outer side of the wooden segments. These tie-rods are screw-threaded at one end to receive the nuts 12'. The adjustable tie-rods 12 are the means whereby the diameters of the rings may be varied. The rods 12 with the truss-bars 9 provide a series of strengthening bands for holding the structure in its set position for molding, and serve other purposes that will be obvious.

Where the wooden and metallic segments join there is a likelihood of a non-rigid joint, and although the component members may have the right curvature these joints between the members make the mold rings liable to bad circular alinement. To overcome this defect alining bars 15 are employed, which bars may be either T iron-bars, angle-bars or a double angle bar, as shown in Figs. 2 to 5. These alining bars are curved in an arc of the circle of the structure to be built, and when a number of rings have been set several of these alining bars are secured to the uppermost ring, in which position a flange of the alining bars 15 fits within the groove 5" and thus brings the rings within its alinement. The alining bars may be about the length of the sheet metal segments so that only one bar will be required for each pair of metal segments 3 and one wooden segment, but of course they may be made longer so as to extend over several pairs of segments.

As heretofore pointed out, the structure being built is built up in successive courses, each course being complete before the next course is built, the idea being as shown in Fig. 17 of the drawing. As the sections are practically of the height of a single course, it will be readily understood that successive courses of the built-up structure are provided by successive courses of the sectional molds, the one course being built being almost completed before the molds for the next course are placed in position, as indicated in Fig. 17. By reason of this fact, it will be readily understood that while the molds of one section will provide an alining structure for the successive sections at its bottom, the alining feature at the top of the successive course cannot be provided by the sections themselves, and it is for this purpose that the alining bars 15 are provided, these bars being of permanent curvature and serving to aline one section with respect to its adjacent section, without affecting the curvature of the sections themselves, this curvature being provided by the truss arrangement heretofore referred to. These alining bars in addition render the normally non-rigid joint between sections rigid and, at the same time, prevent the groove being clogged with concrete during the filling of the mold, the removal of the bar 15 after the mold has been filled, leaving the groove entirely clear and ready to receive the tongue at the bottom of the next ring, it being obvious that after the mold has been filled, the sections of the course containing the filled portion have received a proper curvature and consequently there is no necessity for the use of additional means at the bottom of the next course.

In constructing tapering structures, as that shown in Fig. 18, the curvature at the base being larger than higher up the alining bars 15 should be made to a smaller radius from time to time since they are used in courses of smaller diameters.

In the course of molding a tower or the like it is necessary to release the rings of a molded course and reset them for another course higher up and to do this within the minimum of time and trouble a number of hangers 16, two for each segment, are provided. The hangers comprise substantially a hook having a slotted shank, as shown in Figs. 6 and 7. During the molding operation these hangers hang idly, on the truss bars 9, but when one course has been molded and the tie-bolts 12 loosened, the ring will drop and be suspended by the hangers, as illustrated in Fig. 7. It is evident that the same result will be accomplished by having special attachments for the hangers instead of using the rods 9 and by using other styles of hangers. The only essential is to have sufficient slack in the hangers to permit of their being hooked or temporarily attached to suitable fixtures belonging to the ring above so that when the lower ring is made free to fall it will become disengaged from the member above before the slack is taken up in the hanger. I adopt the type shown as that best adapted to the work. In addition to the reason given above a further one is that the workmen can reach down from above with suitable poles having hooks and engage the hangers and lift the loosened ring to be reassembled above.

From the foregoing it is clear that rectangular members 3 coöperating with trapezoidal members 8, will form rings differing in perimeter at upper and lower edges, and if means were employed to make the upper and lower edge true circles, the resulting complete mold members would conform in shape to a frustum of a cone.

Rectangular members 3 coöperating with rectangular members 8 will result in complete mold members of equal upper and lower perimeter and will mold a true cylinder, if the upper and lower edges are made to conform to true circles.

Trapezoidal member 3, (Fig. 13) coöperating with rectangular members 8, will result in complete mold members differing in perimeter at upper and lower edges, and if the upper and lower edges are made truly circular in shape, the resulting surface will conform to a frustum of a cone. It is also clear that if trapezoidal members 3 with the longer edges down (Fig. 13) coöperate with trapezoidal members 8 in which the upper edges are the longer, the tendency of the taper in 8 is to counteract the taper in 3, and with the right amount of taper to the members 8, the complete mold members could be made to conform to a true cylinder.

What is claimed as new is:—

1. A mold including inner and outer walls forming an intermediate molding chamber, said walls comprising rings made up of permanent and sectional segments arranged alternately, said sectional segments comprising a panel of connected staves, the sectional segments of one ring adapted to come between the permanent sections of the supporting and superposed rings whereby to aline and brace said sectional segments during the molding of the courses.

2. A mold including inner and outer walls forming an intermediate molding chamber, said walls comprising rings made up of metallic and non-metallic sections arranged alternately, said latter sections comprising a panel of connected staves, said metallic sections provided with flanges at each end whereby the non-metallic sections may be held in alinement with the metallic sections, and means for connecting the several sections together.

3. A mold comprising a plurality of alternately arranged metallic and wooden segments constituting a ring, said wooden segments comprising a panel of connected staves, and means whereby a stave, or staves, may be removed for varying the diameter of the ring.

4. A mold comprising a plurality of metallic and wooden sections, said latter sections comprising a panel of connected staves, the metallic sections being substantially rectangular, the wooden sections being substantially rectangular or trapezoidal, and means whereby either of the wooden sections may be assembled with the metallic sections for molding conical or cylindrical structures.

5. A mold comprising rings constituting a wall, said rings made up of metallic segments and wooden panels, said panels comprising a plurality of connected staves, said segments and panels provided with a groove and tongue on its upper and lower edge respectively, the tongue of one ring adapted to fit within the groove of another ring whereby to support the same for molding a structure in courses.

6. A mold comprising rings constituting a wall for molding a structure in courses, said wall comprising segmental sections, truss bars for holding said sections together, and means carried by said truss bars for supporting the rings during the process of molding the courses.

7. The combination with a plurality of sections forming a mold when assembled, the mold being adjustable to provide mold walls of varying diameter, of a segmental alining member adapted to coöperate with adjacent mold sections to cause the adjacent sections to assume the curvature of the alining member.

8. The combination with a plurality of sections, forming a mold when assembled, the mold being adjustable to provide mold walls of varying diameter, of a segmental alining member adapted to interengage with predetermined mold sections to cause adjacent sections to assume the curvature of the alining member.

9. The combination with a plurality of metallic and non-metallic sections forming a mold when assembled, the mold being adjustable to provide mold walls of varying diameter, of a segmental alining member adapted to interengage with adjacent metallic sections to cause adjacent sections to assume the curvature of the alining member.

10. In apparatus for molding vertical circular concrete structures in horizontal courses, a mold comprising alternately arranged segmental members of sheet metal and wood, means for connecting the members, and independent rigid alining bars corresponding in shape to arcs of the structure circle, said bars bridging the wooden members and overlapping and interengaging with the upper edges of the sheet-metal members, whereby each pair of interengaged sheet metal members will be held in temporary rigid circular alinement until the mold is filled with concrete.

11. In apparatus for molding vertical circular concrete structures in horizontal courses, a mold comprising a plurality of flexible metallic sections arranged in alternation with and separated by wooden mold sections, said wooden sections, and independent segmental alining bars bridging the alternate wooden mold sections and interengaging with the upper edges of the metallic sections to control the relative circular alinement of the interengaged mold sections in assembled relation.

In testimony whereof I affix my signature in presence of two witnesses.

ROBERT B. TUFTS.

Witnesses:
ARTHUR TUFTS,
W. L. POPE.